US009856926B2

(12) United States Patent
Frary

(10) Patent No.: US 9,856,926 B2
(45) Date of Patent: Jan. 2, 2018

(54) TRANSMISSION ASSEMBLY INCLUDING ONE-WAY CLUTCH

(71) Applicant: Schaeffler Technologies AG & Co. KG, Herzogenaurach (DE)

(72) Inventor: Matthew Frary, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 281 days.

(21) Appl. No.: 14/667,990

(22) Filed: Mar. 25, 2015

(65) Prior Publication Data

US 2015/0276046 A1 Oct. 1, 2015

Related U.S. Application Data

(60) Provisional application No. 61/971,375, filed on Mar. 27, 2014.

(51) Int. Cl.
| | |
|---|---|
| *F16D 41/063* | (2006.01) |
| *F16D 47/04* | (2006.01) |
| *F16H 57/08* | (2006.01) |
| *F16D 13/14* | (2006.01) |
| *F16D 15/00* | (2006.01) |
| *F16D 25/0638* | (2006.01) |

(52) U.S. Cl.
CPC ........... *F16D 41/063* (2013.01); *F16D 47/04* (2013.01); *F16D 13/14* (2013.01); *F16D 15/00* (2013.01); *F16D 25/0638* (2013.01); *F16H 2057/087* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 3,202,250 A | 8/1965 | Fulton | |
| 3,595,354 A * | 7/1971 | Charpentier | .......... F16D 41/063 188/82.8 |
| 2008/0053784 A1 | 3/2008 | Davis | |
| 2009/0159390 A1 | 6/2009 | Davis | |

* cited by examiner

*Primary Examiner* — Edwin A Young
(74) *Attorney, Agent, or Firm* — Davidson, Davidson & Kappel, LLC

(57) ABSTRACT

A transmission assembly for a transmission of a motor vehicle drive train is provided. The transmission assembly includes a transmission case; a rotatable component inside the transmission case; and a wedge one-way clutch including an outer surface drivingly coupled to an inner surface of the transmission case. An outer radial end of the rotatable component is fixed to or forms an inner race for the one-way clutch.

19 Claims, 4 Drawing Sheets

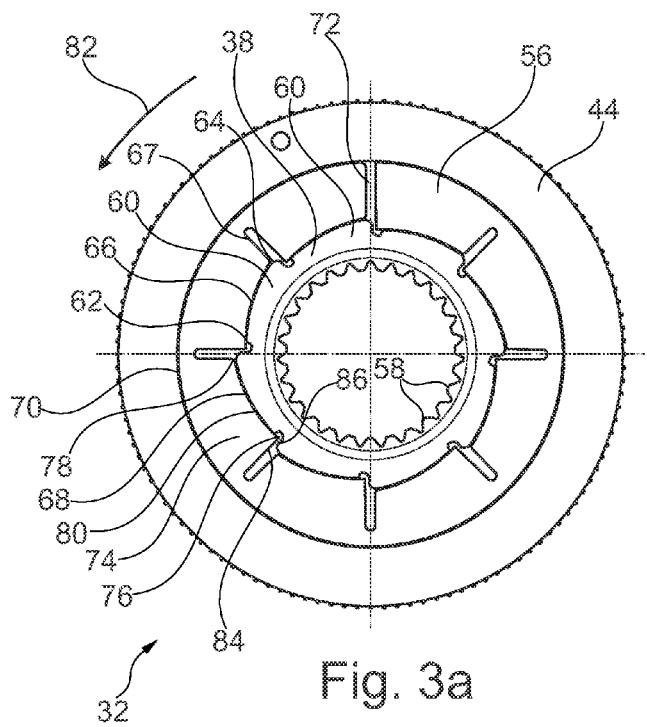
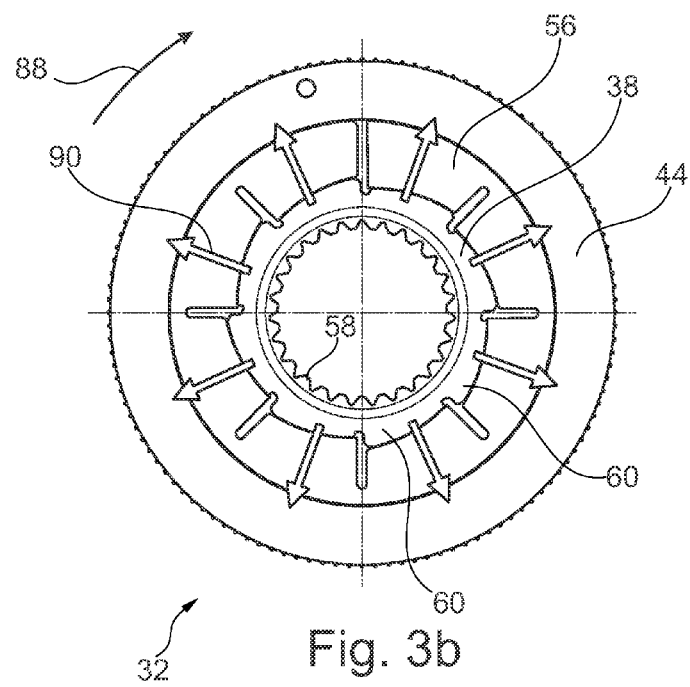

TRANSMISSION ASSEMBLY INCLUDING ONE-WAY CLUTCH

This claims the benefit to U.S. Provisional Patent Application No. 61/971,375, filed on Mar. 27, 2014, which is hereby incorporated by reference herein.

The present disclosure relates generally to transmissions for motor vehicle drive trains and more specifically to transmission assemblies including one-way clutches.

BACKGROUND

U.S. Pub. No. 2009/0159390, U.S. Pub. No. 2008/0053784 and U.S. Pat. No. 3,202,250 disclose wedge one-way clutches.

FIG. 1 shows a conventional transmission assembly 10 including a one-way clutch 12. One-way clutch 12 is splined to a transmission case 14 at an outer diameter of one-way clutch 12 and splined to a planet carrier 16 at an inner diameter 18 of one-way clutch 12. A wet clutch 20 connects to one-way clutch 12 at an inner race 22 of one-way clutch 12. Wet clutch 20 includes a clutch pack 24 having clutch plates 26 that are clampable against an end plate 28 by a piston 29.

SUMMARY OF THE INVENTION

A transmission assembly for a transmission of a motor vehicle drive train according to one aspect of the invention is provided. The transmission assembly includes a transmission case; a rotatable component inside the transmission case; and a wedge one-way clutch including an outer surface drivingly coupled to an inner surface of the transmission case. An outer radial end of the rotatable component is fixed to or forms an inner race for the one-way.

A transmission assembly for a transmission of a motor vehicle drive train according to another aspect of the invention is also provided. The transmission assembly includes a transmission case, a one-way clutch including an outer surface drivingly coupled to an inner surface of the transmission case, a clutch pack and a piston. The piston presses the clutch pack against the one-way clutch to engage the clutch pack.

A method of forming a transmission assembly of a motor vehicle drive train is also provided. The method includes forming a rotatable component to include an inner race of a one-way clutch or fixing the inner race to the rotatable component; providing a wedge plate of the one-way clutch on an outer radial surface of the inner race; providing an outer race of the one-way clutch on an outer radial surface of the wedge plate; and drivingly connecting the outer race of the one-way clutch to an inner radial surface of a transmission case.

BRIEF DESCRIPTION OF THE DRAWINGS

The present invention is described below by reference to the following drawings, in which:

FIGS. 3a and 3b shows wedge one-way clutch in accordance with an embodiment of the present invention.

DETAILED DESCRIPTION

The present disclosure provides two exemplary embodiments of a wedge one-way clutch into a planetary automatic transmission. In the first embodiment, an existing roller clutch is replaced with a wedge clutch, saving an estimated 12 mm of axial space. An outer race is splined to a transmission case and an inner race is riveted to a clutch carrier. In the second embodiment, the outer race is used as an end or backing plate for a clutch pack, with an estimated savings of up to 18 mm of axial space.

Figure 1:
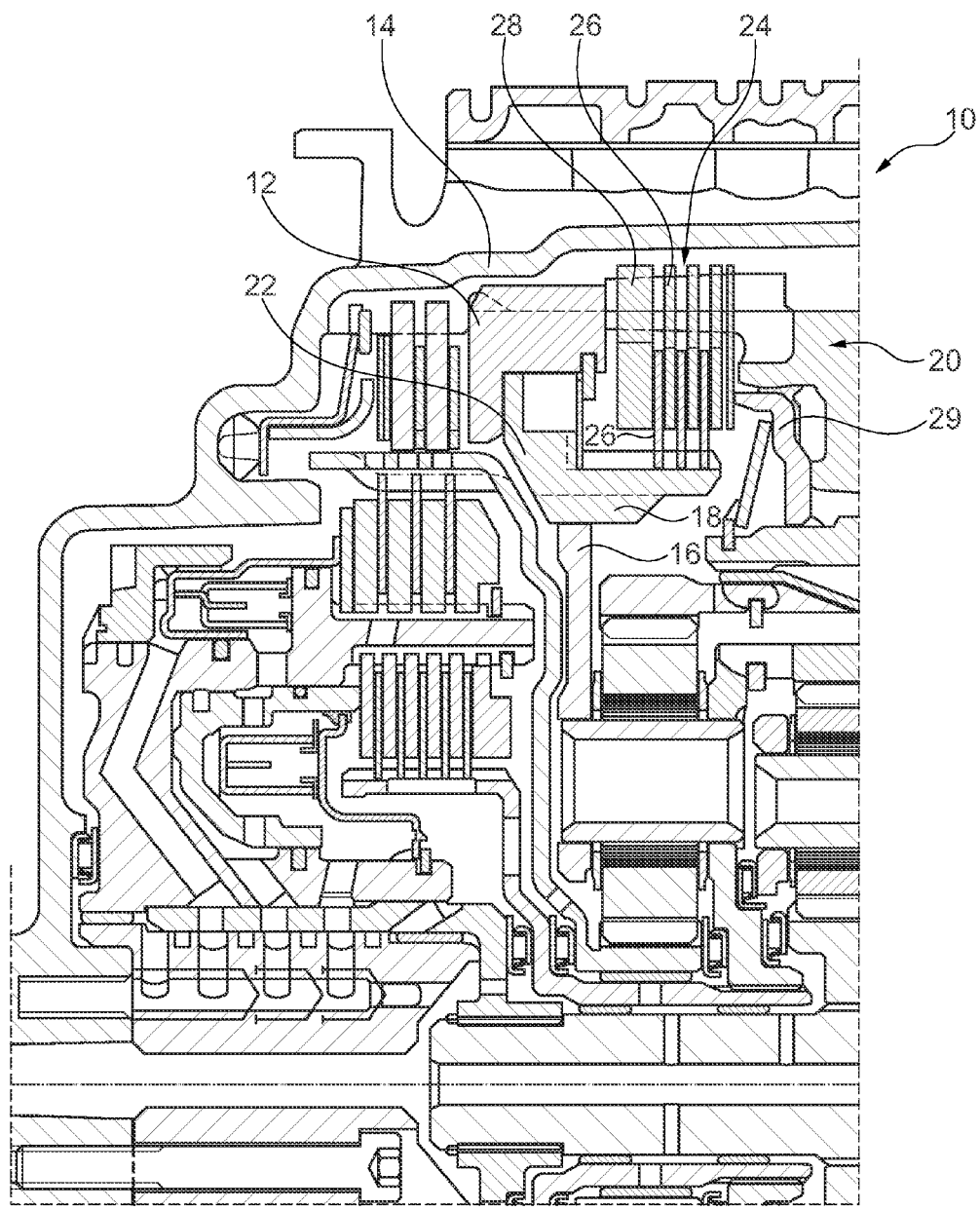
FIG. 1 shows a conventional transmission assembly.
Figure 2:
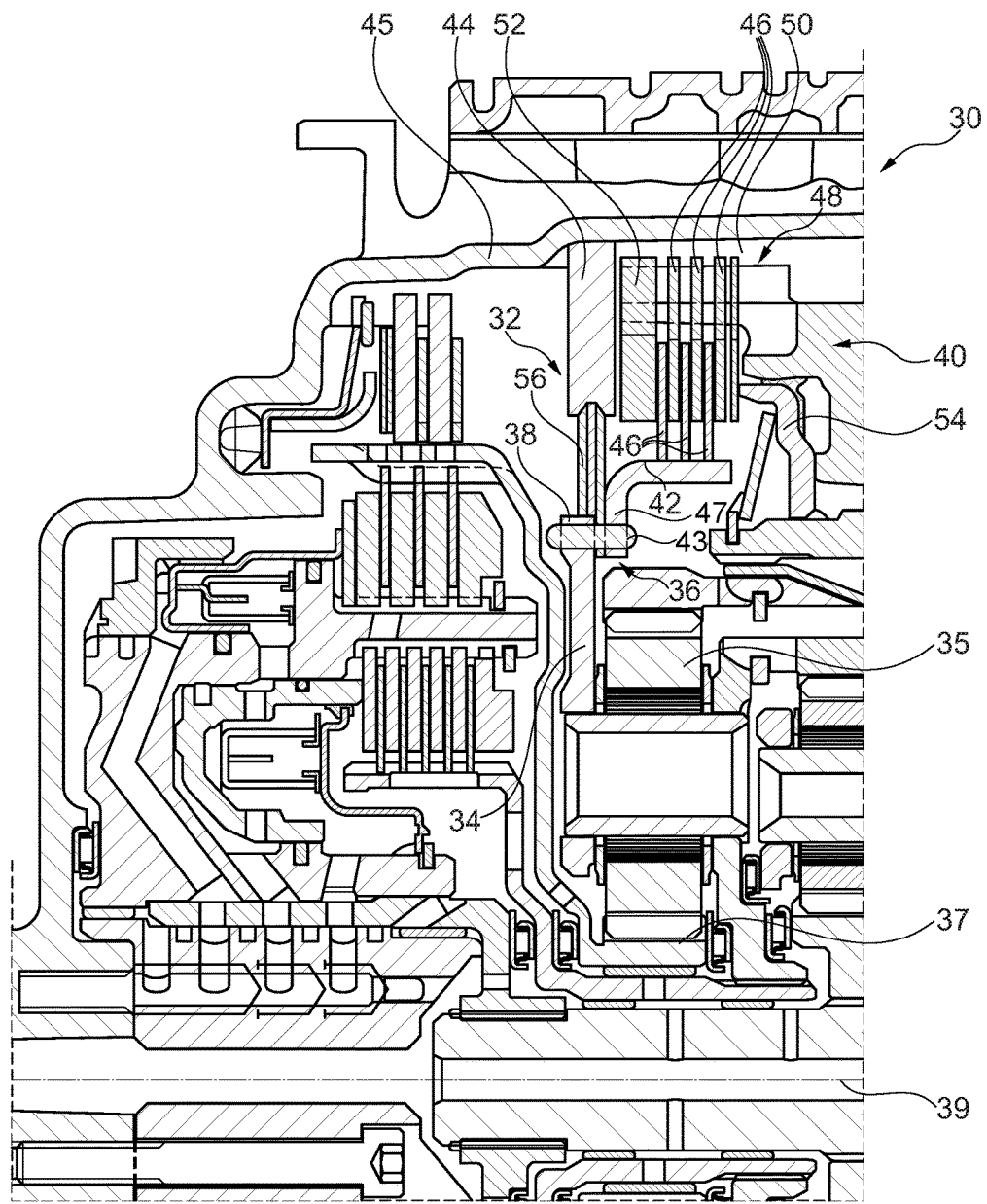
FIG. 2 shows a transmission assembly for a transmission of a motor vehicle drive train in accordance with a first embodiment of the present invention.

FIG. 2 shows a transmission assembly 30 for a transmission of a motor vehicle drive train in accordance with an embodiment of the present invention. In contrast to transmission assembly 10, one-way clutch 12 is replaced by a wedge one-way clutch 32. Transmission assembly 30 includes a torque transmitting rotatable component in the form of a planet carrier 34 having an outer radial end 36 that is fixed to or forms an inner race 38 for one-way clutch 32. Planet carrier 34 supports planet gears 35 that are geared to a sun gear 37 centered on an axis 39.

To connect one-way clutch 32 to a wet clutch 40, inner race 38 is riveted to a clutch carrier 42 via a rivet 43 passing axially through inner race 38 and an inner radial extension 47 of clutch carrier 42. Clutch carrier 42 axially slidingly supports a radial inner surface of some clutch plates 46 of a clutch pack 48, while others of clutch plates 46 are axially slidingly supported on outer radial surfaces thereof by teeth of an inner radial splined surface 50 of a transmission case 45 surrounding one-way clutch 32 and wet clutch 40. Clutch plates 46 of clutch pack 48 are clampable against an end plate 52 of wet clutch 40 by a piston 54 to engage clutch pack 48 and drivingly couple wet clutch 40 to planet carrier 34.

Wedge one-way clutch 32 further includes a wedge plate 56 and an outer race 44 on the outside of wedge plate 56. In one embodiment, wedge plate 56 may be formed by a plurality of wedge plates sandwiched together axially, with all of the wedge plates being held at their radial inner edges by inner race 38 and at their radial outer edges by outer race 44. Outer race 44 is splined to transmission case 45 by teeth a splined outer radial surface of outer race 44 meshing with teeth of inner radial splined surface 50 of transmission case 45. As discussed below with respect to FIG. 3, wedge plate 56 rotates in outer race 44 without transferring torque from outer race 44 to inner race 38 when outer race 44 is rotated by transmission case 45 in a first circumferential direction, but wedge plate 56 transfers torque from outer race 44 to inner race 38 when outer race 44 is rotated by transmission case 45 in a second circumferential direction opposite the first circumferential direction. Accordingly, one-way clutch 32 transfers torque from transmission case 45 to plate carrier 34 for rotation about axis 39 when outer race 44 is rotated in the second circumferential direction about axis 39, but isolates plate carrier 34 from transmission case 45 by uncoupling plate carrier 34 from transmission case 45 when outer race 44 is rotated in the first circumferential direction about axis 39. Once wet clutch 40 is engaged, transmission case 45 transfers torque from wet clutch 40 to planetary carrier 34 as transmission case 45 rotates in the first circumferential direction and as transmission case 45 rotates in the second circumferential direction.

In contrast with transmission assembly 10, transmission assembly 30 may save approximately 12 mm axially in the package inside case 45. In preferred embodiments, one-way clutch 32 has a thickness of less than or equal to 10 mm, which is 8 mm in one preferred embodiment. Typically, mechanical one-way clutch 12 is at least 20 mm thick.

FIGS. 3a and 3b shows wedge one-way clutch 32 in accordance with an embodiment of the present invention. Wedge one-way clutch 32 includes inner race 38, wedge plate 56 and outer race 44. In embodiments where inner race 38 is rotatably fixed to planet carrier 34, as opposed to being formed by planet carrier 34, inner race 38 may include teeth 58 on an inner radial surface thereof for meshing with teeth on an outer radial surface of planet carrier 34. On an outer radial surface of inner race 38, inner race 38 includes a plurality of radially and circumferentially extending wedges 60. Each wedge 60 includes a radial inner end 62 and a radial outer end 64 and has a ramp surface 66 extending radially and circumferentially between ends 62, 64.

Wedge plate 56 is formed to include a plurality of partially radially extending slots 67 formed therein extending from an inner radial surface 68 into wedge plate 56 shy of an outer radial surface 70 of wedge plate 56 and includes one fully radially extending slot 72 extending from inner radial surface 68 to outer radial surface 70. Wedge plate 56 also includes a plurality of radially and circumferentially extending wedges 74 for engaging wedges 60, such that between each slot 67 and the circumferentially adjacent slot 67, wedge plate 56 includes one wedge 74. Each wedge 74 includes a radial inner end 76 and a radial outer end 78 and has a ramp surface 80 extending radially and circumferentially between ends 76, 78. Each wedge 60 is circumferentially aligned with one of wedges 74 so each ramp surface 66 is flush with one of ramp surfaces 80.

When outer race 44 is rotated in a first circumferential direction 82, as shown in FIG. 3a, a circumferential edge 84 of each wedge 74 adjacent the respective radial inner end 78 contacts a circumferential edge 86 of one of wedges 60 adjacent the respective radial outer end 64. The contact between edges 84, 86 results in inner race 38 stopping wedge plate 56 from rotating with outer race 44, which slides along outer radial surface 70 of wedge plate 56. When outer race 44 is rotated in a second circumferential direction 88 opposite first circumferential direction 82, as shown in FIG. 3b, edges 84 move away from adjacent edges 86 while wedges 74 slide along wedges 60 such that the interaction between wedges 60, 74 creates radial outward forces, which are illustrated in FIG. 3b by arrows 90, wedging wedge plate 56 between inner race 38 and outer race 44. The radial outward forces wedging wedge plate 56 between inner race 38 and outer race 44 causing inner race 38, wedge plate 56 and outer race 44 to rotate together in second circumferential direction 88.

Figure 4:
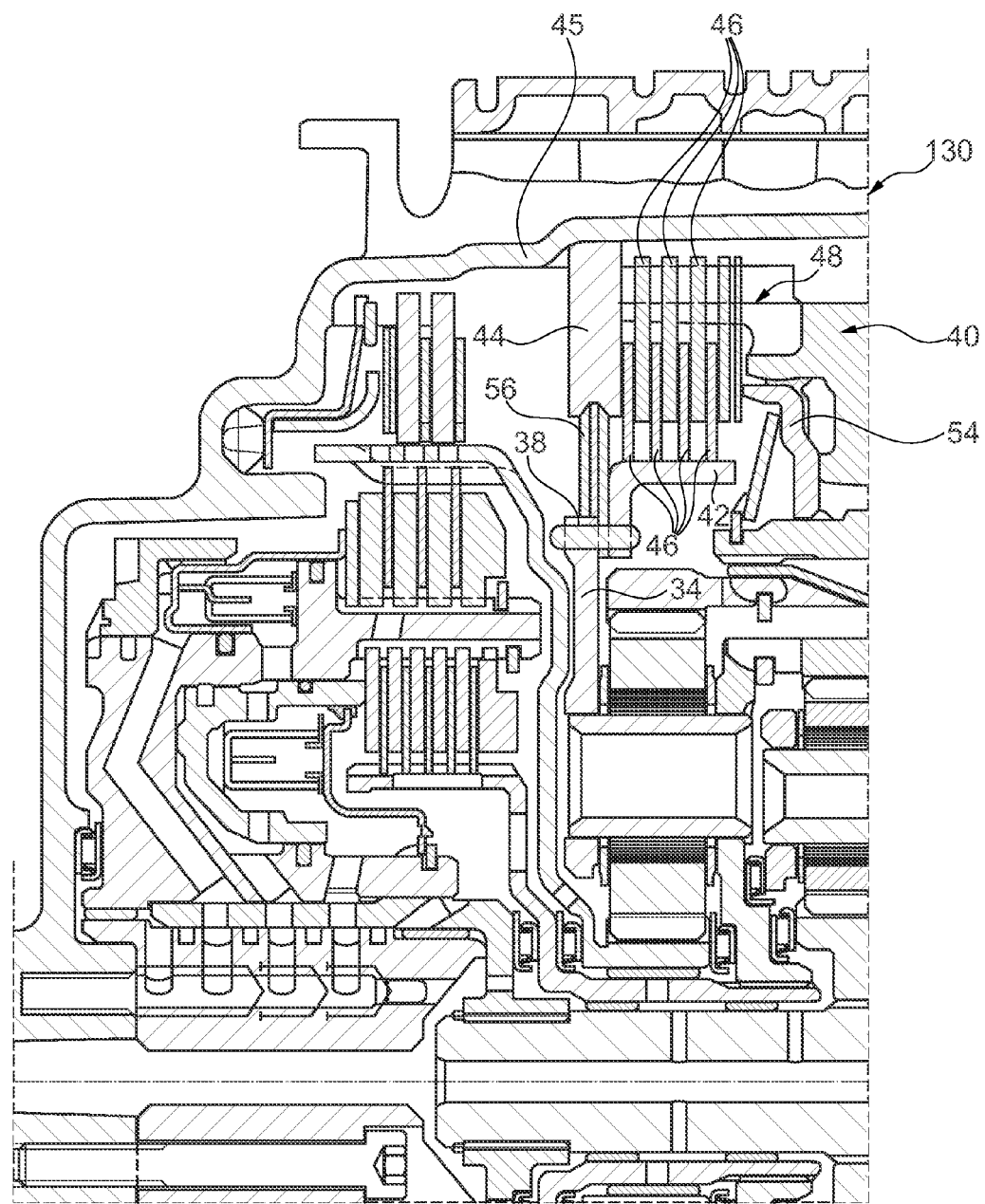
FIG. 4 shows a transmission assembly for a transmission of a motor vehicle drive train in accordance with a second embodiment of the present invention.

FIG. 4 shows a transmission assembly 130 for a transmission of a motor vehicle drive train in accordance with another embodiment of the present invention. Transmission assembly 130 is formed in substantially the same manner as transmission assembly 30 and includes wedge one-way clutch 32. The only difference between transmission assemblies 30, 130 is that end plate 52 has been omitted from transmission assembly 130 and instead transmission assembly utilizes one-way clutch 32, specifically outer race 44, as the end plate for wet clutch 40. Piston 54 presses clutch pack 48 directly against one-way clutch 32 such that the clutch plate 46 closest to one-way clutch 32 contacts one-way clutch 32 to engage clutch pack 48. Accordingly, clutch plates 46 of clutch pack 48 are clampable against one-way clutch 32, specifically outer race 44, by piston 54 to engage clutch pack 48 and drivingly couple transmission case 45 to planetary carrier 34 via wet clutch 40.

In contrast with transmission assembly 10, transmission assembly 130 may save approximately 18 mm axially in the package inside case 45, with an additional 6 mm of space savings being provided by utilizing one-way clutch 32 as the end plate of wet clutch 40. In alternative embodiments, a different type of one-way clutch, for example a mechanical ratcheting one-way clutch, may be used as the clutch end plate, which still results in an axial space savings.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A transmission assembly for a transmission of a motor vehicle drive train comprising:
    a transmission case;
    a rotatable component inside the transmission case; and
    a wedge one-way clutch including an outer race, an inner race and a wedge plate between the inner race and outer race, the outer race including an outer surface drivingly coupled to an inner surface of the transmission case, an inner radial surface of the wedge plate being held on an outer radial surface of the inner race, an outer radial end of the rotatable component being fixed to or forming the inner race, the wedge plate including a plurality of partially radially extending slots formed therein extending from the inner radial surface of the wedge plate into the wedge plate shy of an outer radial surface of the wedge plate, the partially radially extending slots separating wedges of the wedge plate from each other.

2. The transmission assembly as recited in claim 1 further comprising a clutch carrier riveted to the rotatable component.

3. The transmission assembly as recited in claim 2 further comprising a clutch pack including clutch plates axially slidable along the clutch carrier.

4. The transmission assembly as recited in claim 3 wherein a portion of the wedge one-way clutch forms an end plate for the clutch pack.

5. The transmission assembly as recited in claim 4 further comprising a piston engaging the clutch pack against an outer race of the wedge one-way clutch.

6. The transmission assembly as recited in claim 1 wherein the outer radial surface of the inner race includes a plurality of radially and circumferentially extending wedges.

7. The transmission assembly as recited in claim 1 wherein the wedge plate is formed by a split ring having a fully radially extending slot extending from the inner radial surface of the wedge plate to the outer radial surface of the wedge plate.

8. A transmission assembly for a transmission of a motor vehicle drive train comprising:
    a transmission case;
    a one-way clutch including an outer surface drivingly coupled to an inner surface of the transmission case;
    a clutch pack; and
    a piston, the piston pressing the clutch pack against the one-way clutch to engage the clutch pack.

9. The transmission assembly as recited in claim 8 further comprising a rotatable component, the one-way clutch including an inner race fixed to the rotatable component.

10. The transmission assembly as recited in claim 9 wherein the rotatable component is a planet carrier.

11. The transmission assembly as recited in claim 9 further comprising a clutch carrier axially slidably supporting an inner radius of at least one clutch plate of the clutch pack, the inner race being riveted to the clutch carrier.

12. The transmission assembly as recited in claim 9 wherein the one-way clutch includes a wedge plate, the inner race includes a wedged outer surface supporting the wedge plate.

13. The transmission assembly as recited in claim 12 wherein the one-way clutch includes an outer race, the wedge plate transferring torque from the inner race to the outer race when the inner race is rotated in a first circumferential direction.

14. The transmission assembly as recited in claim 13 wherein the wedge plate rotates in the outer race without transferring torque from the inner race to the outer race when the inner race is rotated in a second circumferential direction opposite the first circumferential direction.

15. The transmission assembly as recited in claim 13 wherein the outer race includes the outer surface, the outer surface including teeth for meshing with teeth of the inner surface of the transmission case.

16. A method of forming a transmission assembly of a motor vehicle drive train comprising:

forming a rotatable component to include an inner race of a one-way clutch or fixing the inner race to the rotatable component;

providing a wedge plate of the one-way clutch on an outer radial surface of the inner race;

providing an outer race of the one-way clutch on an outer radial surface of the wedge plate;

drivingly connecting the outer race of the one-way clutch to an inner surface of a transmission case; and fixing the inner race to a radially extending portion of a clutch carrier by passing a fastener through the inner race and the radially extending portion of the clutch carrier, the clutch carrier axially slidably supporting an inner radius of one or more clutch plates of a clutch pack.

17. The method as recited in claim 16 wherein the rotatable component is a planet carrier.

18. The method as recited in claim 16 wherein the passing the fastener through the inner race and the radially extending portion of the clutch carrier includes riveting the inner race to the clutch carrier.

19. The method as recited in claim 18 further comprising providing the outer race axially adjacent to the clutch pack, such that the clutch plates of the clutch pack are clampable against the outer race.

* * * * *